Dec. 8, 1925.
T. E. SHERIDAN
1,564,368
ROAD DRAG
Filed July 17, 1925
2 Sheets-Sheet 1
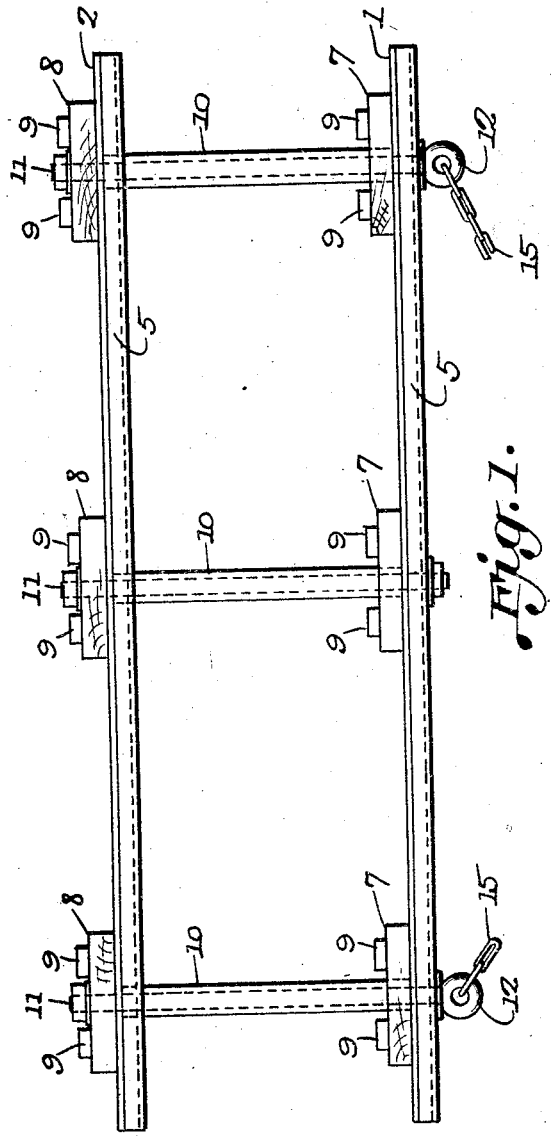
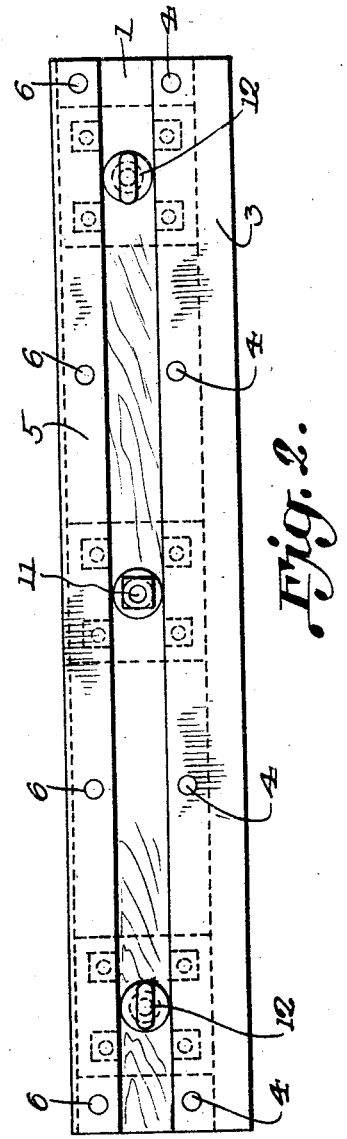
Inventor
Thomas E. Sheridan
By C. A. Snow & Co.
Attorneys

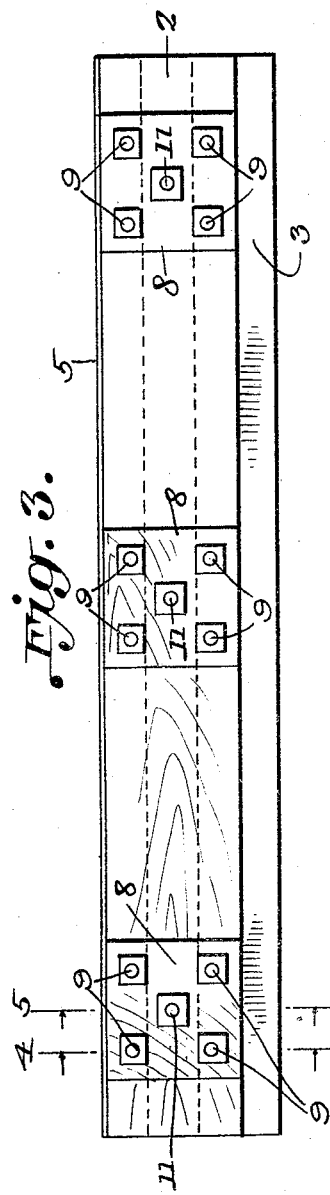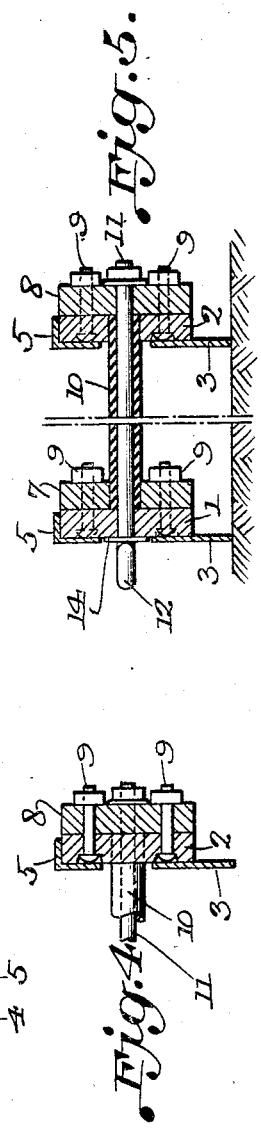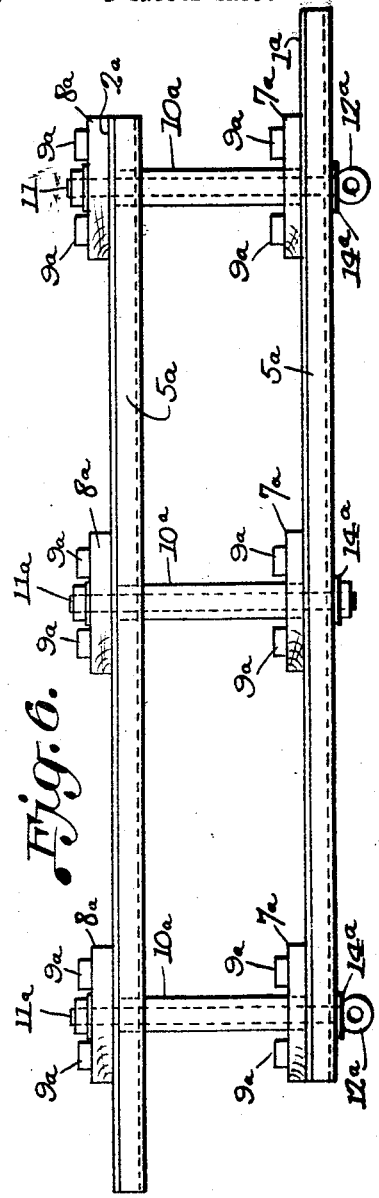

Patented Dec. 8, 1925.

1,564,368

UNITED STATES PATENT OFFICE.

THOMAS E. SHERIDAN, OF SHENANDOAH, IOWA.

ROAD DRAG.

Application filed July 17, 1925. Serial No. 44,281.

*To all whom it may concern:*

Be it known that I, THOMAS E. SHERIDAN, a citizen of the United States, residing at Shenandoah, in the county of Page and State of Iowa, have invented a new and useful Road Drag, of which the following is a specification.

This invention aims to provide a road drag which is reversible so that it may be used either for scraping or for smoothing. Another object of the invention is to provide an unusually strong connection between the bars of the drag.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in top plan, a device constructed in accordance with the invention, Figure 2 is a front elevation; Figure 3 is a rear elevation; Figure 4 is a cross section on the line 4—4 of Figure 3; Figure 5 is a section on the line 5—5 of Figure 3, parts being broken away; Figure 6 is a top plan showing a modification.

The drag comprises a forward bar 1 and a rear bar 2 preferably disposed in parallel relation. Depending scraper blades 3 are secured at 4 to the forward surfaces of the bars 1 and 2. Angular smoothing blades 5 extend downwardly along the forward surfaces of the bars 1 and 2 and rearwardly along the upper edges of the said bars. The blades 5 are secured to the bars 1 and 2 as shown at 6. Blocks 7 are mounted on the rear surface of the forward bar 1, and blocks 8 are mounted on the rear surface of the rear bar 2. The blocks 7 and 8 are held in place by securing elements 9 mounted in the bars 1 and 2. The blades 3 and the vertical flanges of the blades 5 overlap the forward ends of the securing elements 9 and aid in holding them in place.

The bars 1 and 2 are held apart by tubular spacers 10. The forward ends of the spacers 10 extend through the blocks 7 and abut against the forward bar 1. The spacers 10 extend through the rear bar 2 and abut against the blocks 8. Securing devices 11, such as bolts, are extended through the spacers 10, the bar 1, the blocks 7, the bar 2, and the blocks 8 and hold the bars 1 and 2 about the ends of the spacers. At their forward ends, certain of the securing devices 11 have eyes 12 or the like. Washers 14, are mounted on the securing devices 11, between the eyes 12 and the bar 1. With the eyes 12, a draft-rigging 15 of any kind may be assembled.

In Figure 5, the scraper blades 3 are shown in operation, but the drag may be turned up-side-down, the parts 5 then serving as smoothers. Owing to the way in which the parts 12—1—7—9—3—5—8—10—11 are assembled, an unusually strong structure results.

In Figure 1, the ends of the bars 1 and 2 are lined up in a direction parallel to the line of advance, but, if desired, each bar may project laterally beyond the other bar, as shown in Figure 6. In Figure 6, parts hereinbefore described have been designated by numerals previously used, with the suffix "*a*".

What is claimed is:—

A scraper comprising bars, blocks on the corresponding surfaces of the bars, a tubular spacer extended through the block of one bar and abutting against the said bar, the spacer passing through the other bar and abutting against the block of that bar, a securing device extended through the spacer, and through the blocks and the bars, securing elements connecting the blocks with the bars, and blades attached to the bars and covering the securing elements at one end.

In testimony that I claim the foregoing as my own, I have hereto affixed my signature.

THOMAS E. SHERIDAN.